(12) United States Patent
Ishikawa

(10) Patent No.: US 7,635,166 B2
(45) Date of Patent: Dec. 22, 2009

(54) CONTROLLER FOR SEAT LOCKING DEVICE

(75) Inventor: Tetsuya Ishikawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 7 days.

(21) Appl. No.: 11/789,382

(22) Filed: Apr. 24, 2007

(65) Prior Publication Data
US 2008/0042481 A1 Feb. 21, 2008

(30) Foreign Application Priority Data
Jun. 26, 2006 (JP) ............ P 2006-175219

(51) Int. Cl.
*A47C 31/00* (2006.01)
*B60N 2/02* (2006.01)
(52) U.S. Cl. ............... 297/463.1; 297/378.13
(58) Field of Classification Search ....... 297/463.1, 297/378.12, 378.13; 296/65.16, 65.17; 70/261; 292/DIG. 42, DIG. 43, DIG. 31
See application file for complete search history.

(56) References Cited

U.S. PATENT DOCUMENTS

| | | | | |
|---|---|---|---|---|
| 2,668,076 | A * | 2/1954 | Troche et al. | 292/336.3 |
| 5,762,401 | A * | 6/1998 | Bernard | 297/378.13 |
| 7,226,129 | B2 * | 6/2007 | Brandes et al. | 297/378.13 |
| 2007/0046091 | A1 * | 3/2007 | Day et al. | 297/378.12 |

FOREIGN PATENT DOCUMENTS

JP 2006-069330 3/2006

* cited by examiner

*Primary Examiner*—Milton Nelson, Jr.
(74) *Attorney, Agent, or Firm*—Carrier, Blackman & Associates, P.C.; William D. Blackman; Joseph P. Carrier

(57) ABSTRACT

A controller for a seat locking device which locks a seatback, provided with: a holder having an opening at a top end thereof; an operation knob which is rotatably provided in the opening of the holder, and transmits an operating power to the seat locking device when a rotating operation is applied thereto; and a compensator which prevents gapping between a back face of a protrusion of the operation knob, facing a side of the opening of the holder, and a side wall of the holder facing the back face.

9 Claims, 5 Drawing Sheets

CONTROLLER FOR SEAT LOCKING DEVICE

BACKGROUND OF THE INVENTION

Priority is claimed on Japanese Patent Application No. 2006-175219, filed Jun. 26, 2006, the contents of which are incorporated herein by reference.

FIELD OF THE INVENTION

The present invention relates to a controller for a seat locking device which locks a seatback of a vehicle.

DESCRIPTION OF THE RELATED ART

A rear seat and the like of a vehicle have a seat locking device which locks a position of a seatback, or permits the seatback folded forwards when locking by the seat locking device is released.

A controller for releasing operation of the seat locking device is located at a shoulder part of the seatback or like. The controller is provided with, for example, an operation knob which is connected with the seat locking device; and the seat locking device is released by an inclining operation of the operation knob (for example, refer to Japanese Unexamined Patent Application, First Publication No. 2006-69330).

The operation knob of the controller is rotatably supported in a holder having an opening at a top end thereof. When the seat locking device is in a locking position, the operation knob is maintained in an inclined position in the holder; and in this state, the seat locking device is released by lifting an end of the operation knob.

However, in this conventional controller, since the end of the operation knob is formed in a substantially-flat plate shape, when the end of the operation knob is lifted to release the locking state, there was a possibility in that a comparatively large gap was produced between a back face of the operation knob and a side wall of the holder, and a foreign bodies fell into the gap. In such case, if the fallen foreign bodies were sandwiched by the gap, there was a concern that the operation knob hardly returns toward a locking direction.

The present invention was made in view of the above-mentioned circumstances and has an object of providing a controller for a seat locking device which prevents a foreign body getting into a back side of an operation knob, and thereby enabling stable operations of the operation knob all the time.

SUMMARY OF THE INVENTION

In order to achieve the above object, the present invention employed the followings.

A controller for a seat locking device which locks a seatback, provided with: a holder having an opening at a top end thereof; an operation knob which is rotatably provided in the opening of the holder, and transmits an operating power to the seat locking device when a rotating operation is applied thereto; and a compensator which prevents gapping between a back face of a protrusion of the operation knob, facing a side of the opening of the holder, and a side wall of the holder facing the back face.

According to the controller for a seat locking device, while changing rotational positions of the operation knob between a lifted position and a folded position, the compensator suppresses a generation of a gap between the back face of the protrusion of the operation knob and the side wall of the holder; therefore, a foreign body hardly gets into the back side of the operation knob.

Accordingly, since the compensator suppresses the generation of the gap between the back face of the protrusion of the operation knob and the side wall of the holder while changing the rotational positions of the operation knob, it is possible to prevent the foreign body getting into the back side of the operation knob, and thereby enabling a stable operation of the operation knob all the time.

The compensator may be unitarily provided to the operation knob, and may be provided with a curved wall having a substantial-arc shape centering on a rotational axis of the operation knob.

In this case, since the gap between the curved wall and the side wall of the holder is maintained to be constant, it is possible to reliably prevent the foreign body getting into the back side of the operation knob. Accordingly, it is possible to improve the productivity and reduce the manufacturing cost, with an extremely simple structure.

DETAILED DESCRIPTION OF THE INVENTION

Figure 1:
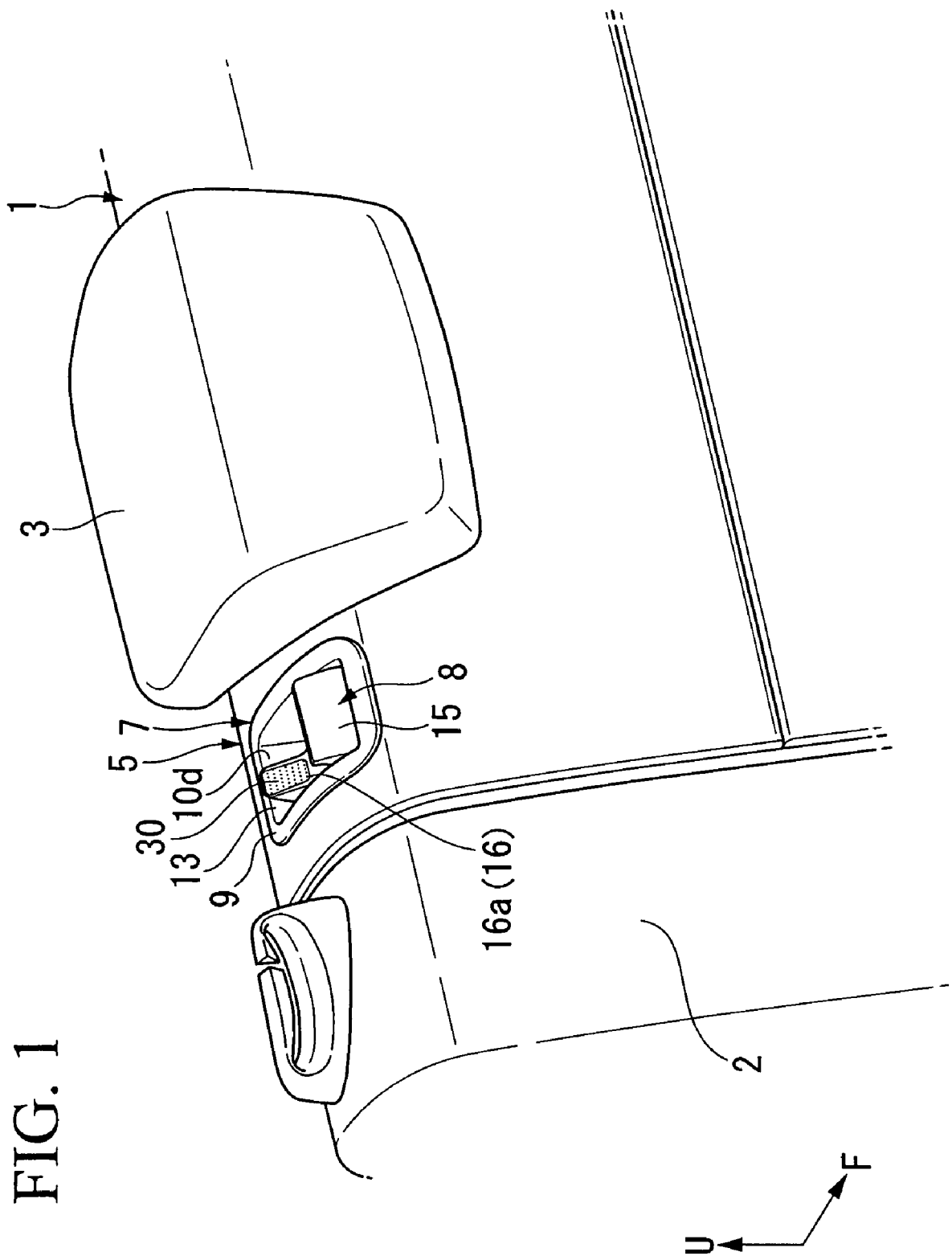
FIG. 1 is a perspective view of a rear seat of a vehicle according to one embodiment of the present invention.

One embodiment of the present invention will be explained below with reference to the drawings. Moreover, in the drawings, the reference symbol "F" denotes forward of a vehicle while the reference symbol "U" denotes upward of the vehicle. In addition, in the following explanation, the forward, the backward, up, and down mean those of the vehicle, if they are not specified.

In FIG. 1, the reference numeral "1" denotes a seatback of a rear seat of the vehicle, the reference numeral "2" denotes a trim member on the vehicle side adjacent to a side of the seatback 1 held in a lifted position, and the reference numeral "3" denotes a headrest mounted on a top of the seatback 1. The seatback 1 is rotatable in the forward centering on a non-illustrated rotatably supporting member, and is locked to a member on a vehicle side by a seat locking device 4 (refer to FIG. 3) when the seatback 1 is in a lifted position shown in FIG. 1. Moreover, the seat locking device 4 includes a locking claw which is urged by a non-illustrated spring. When the seatback 1 is rotated to the lifted position as shown in FIG. 1, the locking claw automatically engages by the spring with a non-illustrated locking bar provided on the vehicle body side.

Figure 2:
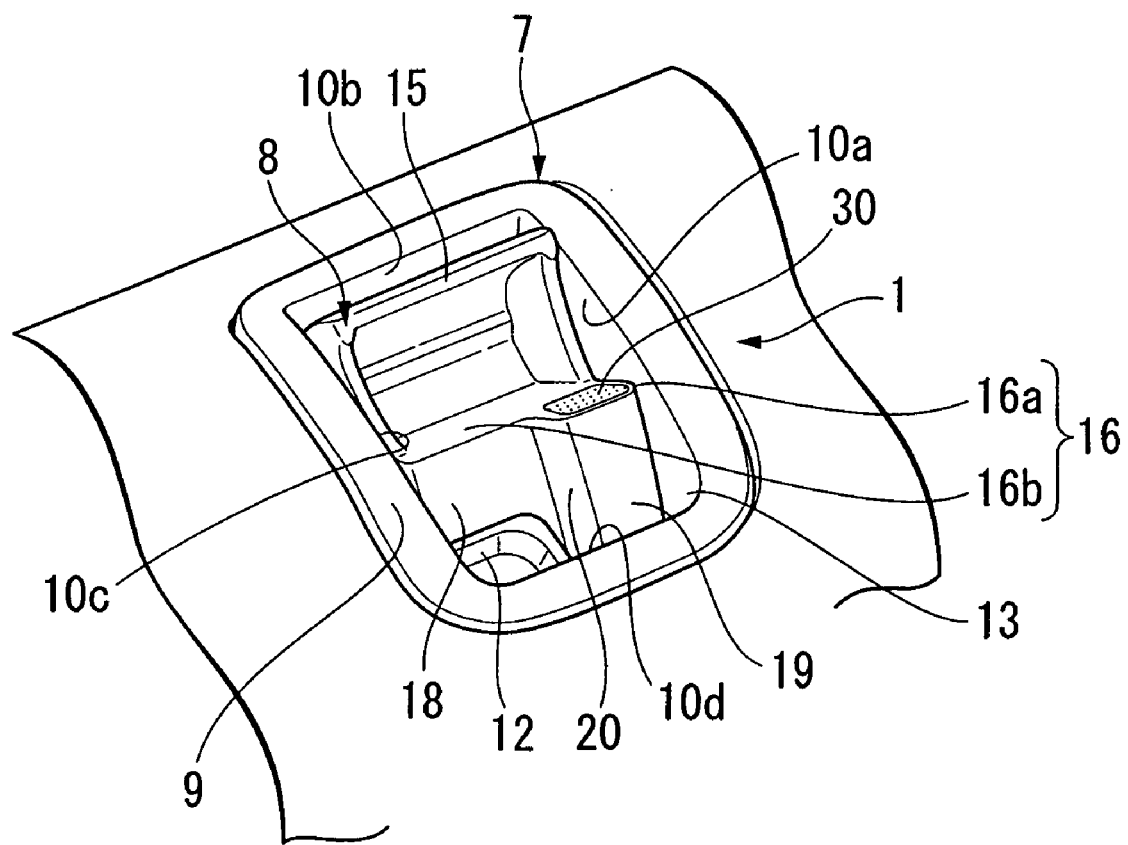
FIG. 2 is a perspective view of a controller of the same embodiment, seen from a back side of the vehicle.
Figure 2:
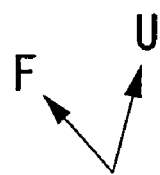
Figure 3:
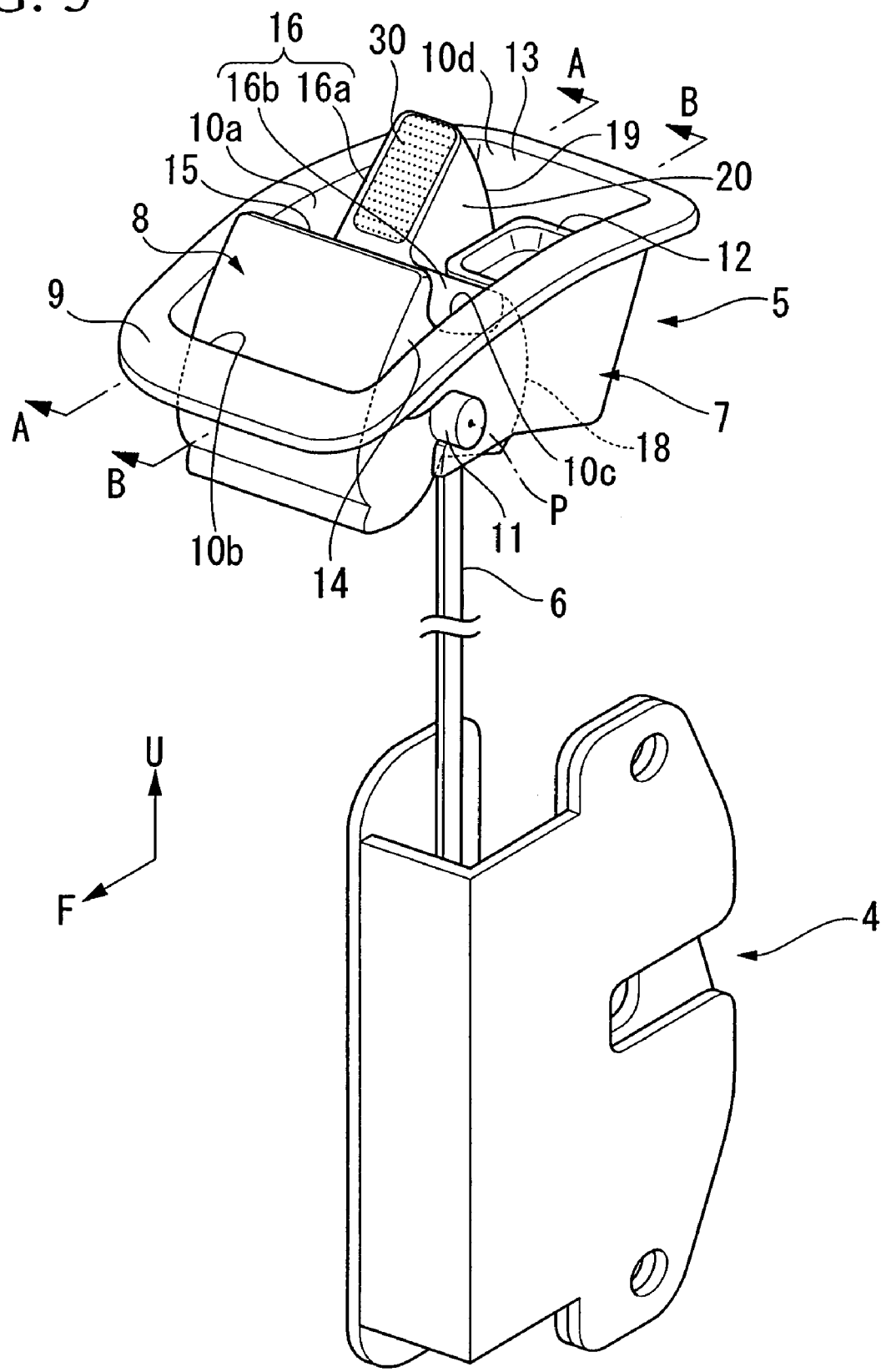
FIG. 3 is a perspective view showing general arrangements of the controller and the seat locking device of the same embodiment.

As shown in FIG. 3, the seat locking device 4 is connected via an operating rod 6 to a controller 5 for releasing the lock. As shown in FIGS. 1 and 2, the controller 5 is located on a top face of the seatback 1 at a position close to the side in the vehicle width direction, and is manually operated by an occupant to release the locking thereof in order to fold the seatback 1 in the forward direction.

The controller 5 is provided with a holder 7 fixed at the top face of the seatback 1, and an operation knob 8 rotatably supported by the holder 7. A top end of the operating rod 6 is operatively connected to the operation knob 8.

The holder 7 is provided with a frame portion 9 having an exterior of a substantially rectangular shape, at the top end thereof. The frame portion 9 is overlapped with an edge portion of a mounting hole (not illustrated) provided on the top surface of the seatback 1. In addition, the holder 7 is provided with side walls 10a to 10d which are joined with the inner edge of the frame portion and form four faces surrounding the inside of the frame portion 9; and an after-mentioned supporting pin 11 of the operation knob 8 is rotatably supported by the pair of side walls 10a and 10c facing with each other, among the side walls 10a to 10d. The pair of side walls 10a and 10c supporting the operation knob 8 are arranged along the vehicle length direction, while the remaining pair of side walls 10b and 10d are arranged at the forward and backward of the pair of side walls 10a and 10c respectively. Moreover, in the following explanation, the side wall 10a located on the exterior side in the vehicle width direction is denoted as "outer side wall 10a", while the side wall 10c located on the interior side in the vehicle width direction is denoted as "inner side wall 10c". Furthermore, the side wall 1Gb located on the forward in the vehicle length direction is denoted as "front side wall 10b", while the side wall 10d located on the rearward in the vehicle length direction is denoted as "rear side wall 10d".

A rack portion 12 having a substantially square shape when viewed in a plan view is located so as to protrude from a corner formed between the inner side wall 10c and the rear side wall 10d. In the present embodiment, a space formed by combining the large square formed in the frame portion 9 and the small square formed in the rack portion 12, is formed as an opening 13. Moreover, the rack portion 12 is located at a higher position than lower ends of the inner side wall 10c and the rear side wall 10d.

On the other hand, the operation knob 8 is provided with side walls 14 that are parallel with the outer side wall 10a and the inner side wall 10c of the holder 7, on the both sides thereof. The supporting pin 11 is provided to the side walls 14 so as to protrude therefrom. Each of the side walls 14 is formed so as to extend in the vertical direction from a location where the supporting pin 11 protrudes, and thereby forming two extended portions in the vertical direction. One of these extended portions of the side wall 14 has an external end line that is joined with the hooking portion 15. As shown in FIGS. 4A to 5B, the hooking portion 15 protrudes from a front side to a rear side of the opening 13, so as to be engageable with a finger of an occupant when the occupant operates the operation knob 8 to apply force thereto.

A bottom end of the hooking portion 15 is joined with a protrusion 16 which extends upwards while passing under the supporting pin 11 in the forward, and of which a distal end extends from the front to the rear of the opening 13. The protrusion 16 is formed such that a substantially half portion in the width direction of the operation knob 8 extends longer than the other portion. In the following explanation, the longer half portion of the protrusion 16 is called as "longer portion 16a", while the shorter half portion of the protrusion 16 is called as "shorter portion 16b". A red-colored warning mark 30 is attached on a top face of the longer portion 16a of the protrusion 16. When the seat locking device 4 is maintained in an unlocked state and the operation knob 8 is lifted, the red-colored warning mark 30 faces forward so as to be seen by the occupant in a front seat side.

In addition, each of two ends of the protrusion 16 is joined with the side walls 14 respectively. A connecting pin 17 joined with the top end of the operating rod 6 is supported at a position between the side walls 16 and passes under the larger portion 16a in the width direction. This connecting pin 17 is located at a position distanced from a center (rotational axis P) of the supporting pin 11 of the operation knob 8. Thus, as shown in FIGS. 4B and 5B, if the hooking portion 15 is lifted to rotate the operation knob 8, then the operating rod 6 is lifted upwardly, thereby releasing the locking of the seat locking device 4.

A curved wall 18 having substantially an arc-shape centering on the rotational axis P of the operation knob 8 is continuously formed with an end of the shorter portion 16b of the protrusion 16, while a curved wall 19 also having substantially an arc-shape centering on the rotational axis P of the operation knob 8 is continuously formed with an end of the longer portion 16a of the protrusion 16. The curved walls 18 and 19 each extends downward from the ends of the shorter portion 16b and the longer portion 16a; and, when the operation knob 8 is in a position between the folded position shown in FIGS. 4A and 5A and the lifted position shown in FIGS. 4B and 5B, these curved walls 18 and 19 always maintain a constant small gap together with front faces of the rack portion 12 and the rear side wall 10d. That is, in the present embodiment, the curved walls 18 and 19 forms a compensator which suppresses generating a gap between the back side of the operation knob 8 and the holder 7.

As shown in FIG. 2, the curved walls 18 and 19 are joined with each other via a connecting wall 20; and the connecting wall 20 always maintains a constant small gap together with a side face of the rack portion 12 when the operation knob 8 is at a position between the folded position and the lifted position. Therefore, in the present embodiment, the connecting wall 20 also forms the compensator together with the curved walls 18 and 19.

Figure 4A:
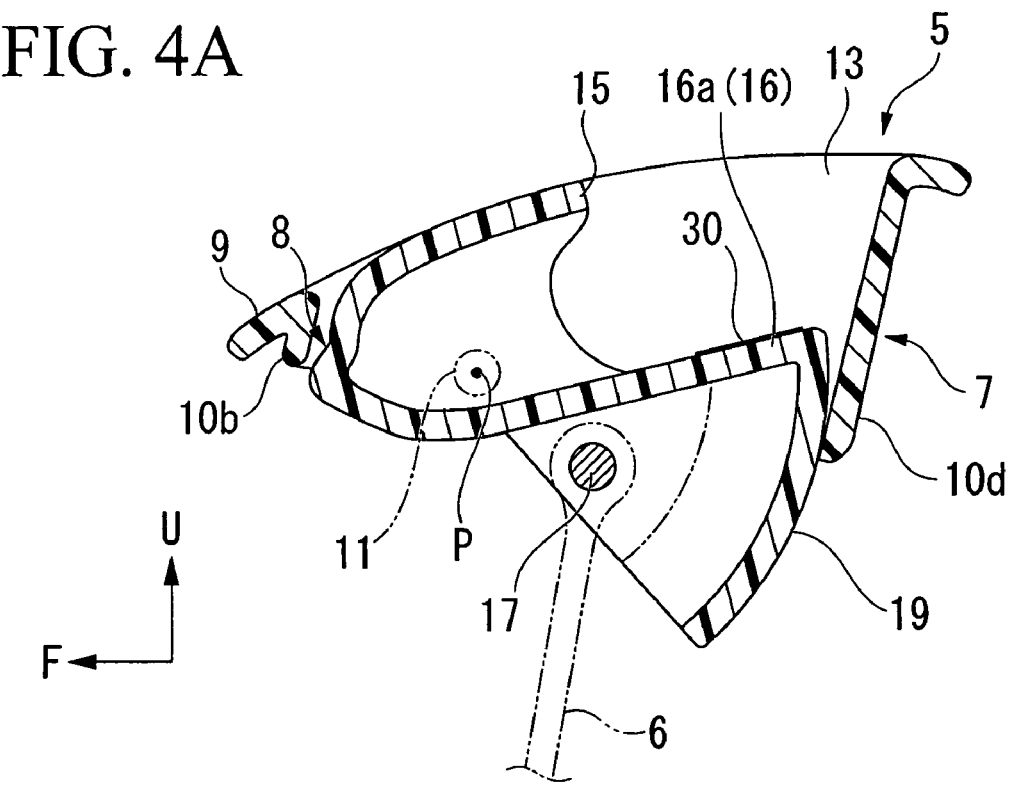
FIG. 4A is a cross-sectional view in a locking state in the same embodiment, taking along a line A-A of FIG. 3.
Figure 4B:
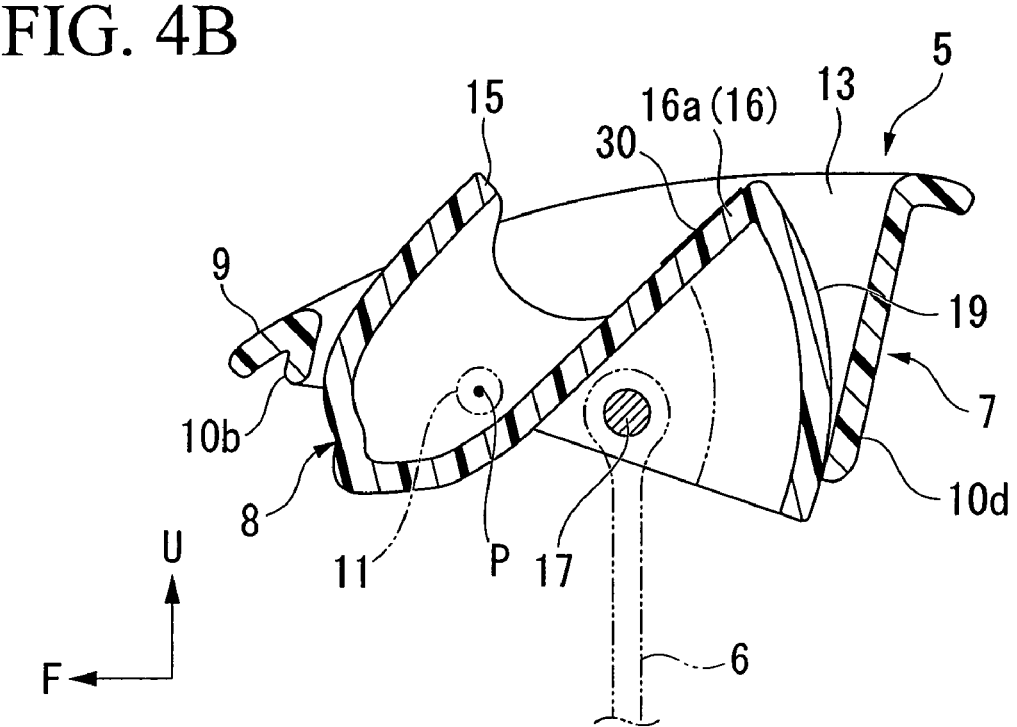
FIG. 4B is a cross-sectional view in an unlocking state in the same embodiment, taking along the line A-A of FIG. 3.
Figure 5A:
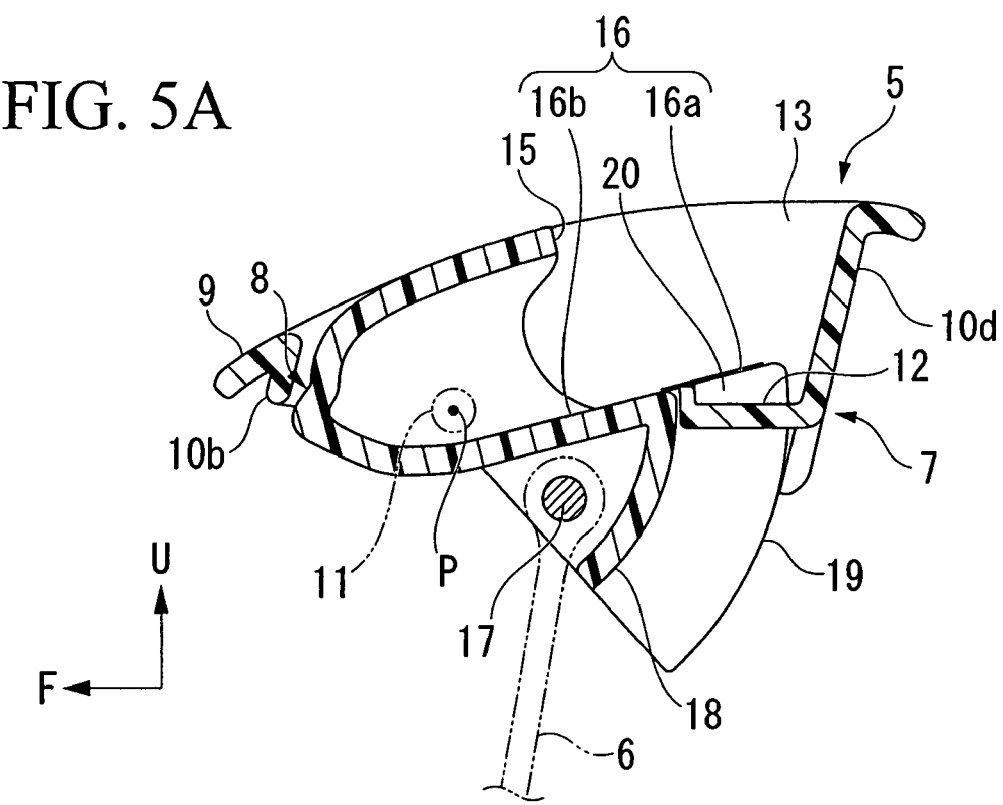
FIG. 5A is a cross-sectional view in a locking state in the same embodiment, taking along a line B-B of FIG. 3.
Figure 5B:
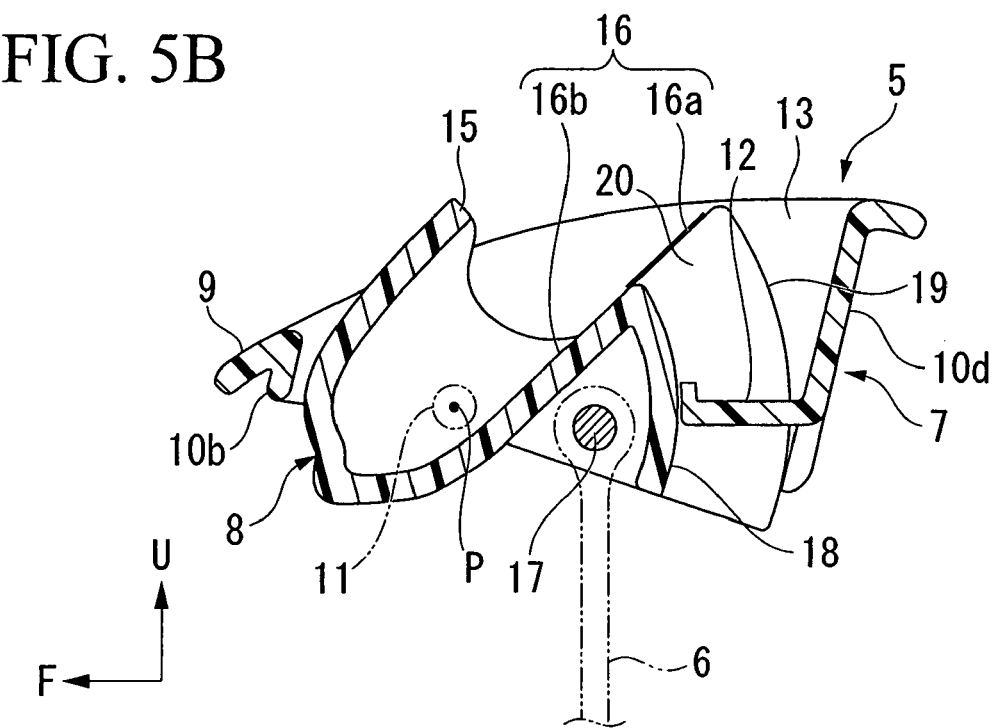
FIG. 5B is a cross-sectional view in an unlocking state in the same embodiment, taking along the line B-B of FIG. 3.

When the seatback 1 is in the lifted position shown in FIG. 1 and is locked by the seat locking device 4, as shown in FIGS. 4A and 5A, in the controller 5, the protrusion 16 of the operation knob 8 is folded rearward. At this time, the warning mark 30 attached to the protrusion 16 faces upward, and is therefore hardly seen from an occupant in the front seat.

In order to release the seat locking device 4 from this state, the occupant will hook the hooking portion 15 of the controller 5 with his or her finger, and will lift up the protrusion 16 of the operation knob 8 as shown in FIGS. 4B and 5B. With this operation, the operation knob 8 will rotate centering on a supporting pin 17 and the warning mark 30 will face the occupant in the front seat; and the operating rod 6 will be lifted upward to release the seat locking device 4.

During a releasing operation of the locking of the controller 5, since the backside of the protrusion 16 forms the constant small gap together with the rack portion 12 and the rear side wall 10d of the holder 7 by the curved walls 18 and 19 and the connecting wall 20, a large foreign body cannot be get into the backside of the operation knob 8 in every positions of the operation knob 8. Accordingly, this controller 5 always enables stable operations of the operation knob 8.

In addition, in this controller 5, since the curved walls 18 and 19 and the connecting wall 20 enable maintaining the small gap between the operation knob 8 and the holder 7 as has been explained in the above, it is possible to further reduce dust and rubbish getting into the inside of the seatback 1 through the gap between the operation knob 8 and the holder 7.

Furthermore, in the present embodiment, the curved walls 18 and 19 and the connecting wall 20 are unitarily formed with the operation knob 8 to form the compensator; therefore, the gap between the back face of the protrusion 16 of the operation knob 8 and the folder 7 facing thereto can be always small with a simple construction. Accordingly, the product quality thereof can be improved without increasing the manufacturing cost thereof.

Moreover, the present invention is not limited only to the above-mentioned embodiment, and the present embodiment may have a variety of modifications without departing from the spirit of the present invention. For example, in the above-embodiment, a construction is employed in which: the protrusion 16 of the operation knob 8 is provided with the longer portion 16a and the shorter portion 16b having different length with each other; the warning mark 30 is attached to the upper face of the longer portion 16a; and the curved walls 19 and 18 are provided to the front ends of the longer portion 16a and the shorter portion 16b. However, it may be arranged such that: the entire of the protrusion has the constant width and the warning mark is attached to the protrusion so as to cover the upper face along the width direction; and one curved surface is provided to the front end of the protrusion.

While a preferred embodiment of the invention has been described and illustrated above, it should be understood that this is an exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

REFERENCE SYMBOLS

1 . . . seatback; 4 . . . seat locking device; 5 . . . controller; 7 . . . holder; 8 . . . operation knob; 10d . . . rear side wall (side wall); 12 . . . rack portion (side wall); 13 . . . opening; 15 . . . hooking portion (protrusion); 16 . . . protrusion; 18 and 19 . . . curved wall; 20 . . . connecting wall; P . . . rotational axis.

What is claimed is:

1. A controller for a seat locking device which locks a seatback, said controller comprising:
   a holder having an opening at a top end thereof;
   an operation knob which is rotatably provided in the opening of the holder, transmits an operating power to the seat locking device when a rotating operation is applied thereto, and is maintained to be lifted when the seat locking device is in an unlocked state, the operation knob being pivotally movable above a rotational axis thereof;
   an operating rod for connecting the controller to the seat locking device, and a support pin which is joined with an upper end of the operating rod and which is supported at a position between opposed side walls of the holder and spaced apart from the rotational axis of the operation knob, whereby pivotal movement of the operation knob about the rotational axis causes a corresponding movement of the operating rod;
   a protrusion which is integrally formed with the operation knob and rotates integrally with the operation knob around the rotational axis to show that the seat locking device is in an unlocked state when the operation knob is lifted; and
   a compensator which prevents gapping between a back face of the protrusion and a side wall of the holder facing the back face when the operation knob is lifted.

2. The controller for a seat locking device according to claim 1, wherein the compensator is integrally provided as part of the operation knob, and is provided with a curved wall having a substantial-arc shape centering on the rotational axis of the operation knob.

3. A controller for a seat locking device which locks a seatback, said controller comprising:
   a holder having an opening at a top end thereof; an operation knob which is rotatably provided in the opening of the holder, transmits an operating power to the seat locking device when a rotating operation is applied thereto, and is maintained to be lifted when the seat locking device is in an unlocked state, wherein the operation knob is pivotally movable about a rotational axis thereof;
   a protrusion which is integrally formed with the operation knob and rotates integrally with the operation knob around the rotational axis to show that the seat locking device is in an unlocked state when the operation knob is lifted;
   a compensator which prevents gapping between a back face of the protrusion and a side wall of the holder facing the back face when the operation knob is lifted; and
   a brightly colored mark attached to the protrusion,
   wherein the protrusion is movable from a lowered position in a first orientation of the operation knob, to a raised position in a second orientation of the operation knob.

4. A controller for a seat locking device which locks a seatback, said controller comprising:
   a holder having an opening at a top end thereof;
   an operation knob which is rotatably provided in the opening of the holder, transmits an operating power to the seat locking device when a rotating operation is applied thereto, and is maintained to be lifted when the seat locking device is in an unlocked state, wherein the operation knob is pivotally movable about a rotational axis thereof;
   a protrusion which is integrally formed with the operation knob and rotates integrally with the operation knob around the rotational axis to show that the seat locking device is in an unlocked state when the operation knob is lifted; and
   a compensator which prevents gapping between a back face of the protrusion and a side wall of the holder facing the back face when the operation knob is lifted, and
   wherein the operation knob comprises:
   a first curved wall portion having substantially an arc-shape centering on the rotational axis of the operation knob and integrally attached to a shorter portion of the protrusion formed on the operation knob,
   a second curved wall portion having substantially an arc-shape centering on the rotational axis of the operation knob and integrally attached to a longer portion of said protrusion, said second curved wall portion being spaced further away from the rotational axis of the operation knob than the first curved wall portion, and
   an intermediate connecting wall extending between and interconnecting the first and second curved wall portions.

5. A controller for a seat locking device which is operable to releasably lock a seatback, said controller comprising:
   a holder having an opening formed therein at a top end thereof;
   an operation knob which is rotatably provided in the opening of the holder, and which transmits an operating power to the seat locking device when a rotating operation is applied thereto, wherein the operation knob is pivotally movable about a rotational axis thereof, and wherein an edge portion of the operation knob provides a hooking portion for enabling pivotal movement of said operation knob by a user;

a protrusion which is integrally formed with the operation knob and which rotates integrally therewith around the rotational axis to show that the seat locking device is in an unlocked state when the protrusion is raised;

a compensator integrally formed with the operation knob which substantially prevents gapping between a back face of the protrusion of the operation knob, facing a side of the opening of the holder, and a side wall of the holder facing the back face;

an operating rod for connecting the controller to the seat locking device;

and a support pin which is joined with an upper end of the operating rod and which is supported at a position between opposed side walls of the holder and spaced apart from the rotational axis of the operation knob, whereby pivotal movement of the operation knob about the rotational axis causes a corresponding movement of the operating rod.

6. The controller for a seat locking device according to claim 5, further comprising a brightly colored mark attached to the protrusion.

7. The controller for a seat locking device according to claim 6, wherein the protrusion is formed such that substantially half of the operation knob in the width direction extends longer than the other half, forming a longer portion and a shorter portion, the brightly colored mark attached on a top face of the longer portion.

8. The controller for a seat locking device according to claim 5, wherein the operation knob comprises:

a first curved wall portion having substantially an arc-shape centering on the rotational axis of the operation knob and integrally attached to a shorter portion of the protrusion formed on the operation knob, a second curved wall portion having substantially an arc-shape centering on the rotational axis of the operation knob and integrally attached to a longer portion of said protrusion, said second curved wall portion being spaced further away from the rotational axis of the operation knob than the first curved wall portion, and an intermediate connecting wall extending between and interconnecting the first and second curved wall portions.

9. The controller for a seat locking device according to claim 5, wherein the protrusion is movable from a lowered position in a first orientation of the operation knob, to a raised position in a second orientation of the operation knob.

* * * * *